July 15, 1969     T. R. SOWDER     3,455,344
TRAM HOPPER LOADER APPARATUS AND METHOD
Filed Nov. 7, 1966     2 Sheets-Sheet 1
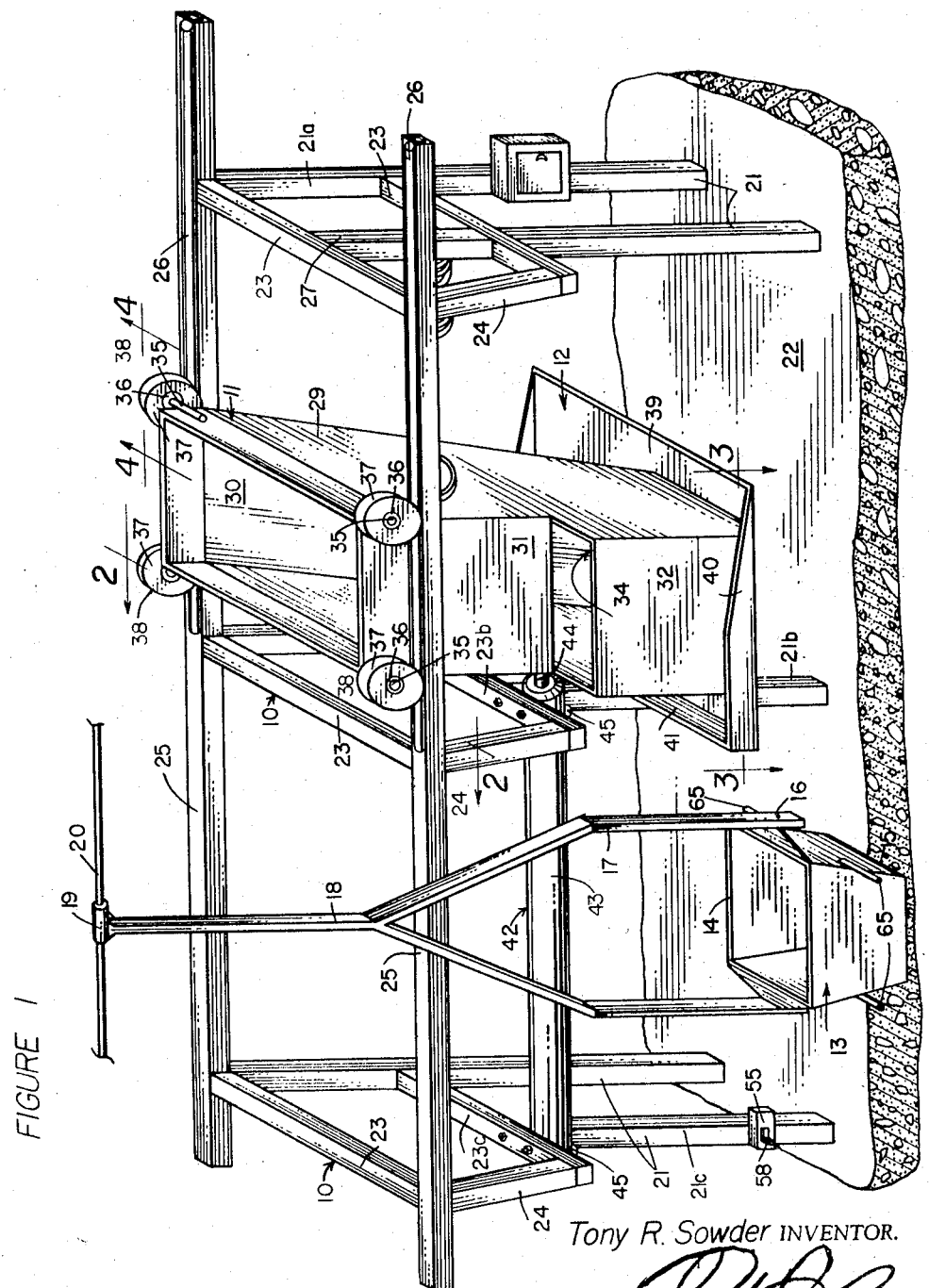
FIGURE 1
Tony R. Sowder INVENTOR.
Attorney July 15, 1969   T. R. SOWDER   3,455,344
TRAM HOPPER LOADER APPARATUS AND METHOD
Filed Nov. 7, 1966   2 Sheets-Sheet 2

Tony R. Sowder INVENTOR.

BY
Attorney

United States Patent Office 3,455,344
Patented July 15, 1969

3,455,344
TRAM HOPPER LOADER APPARATUS AND METHOD
Tony R. Sowder, 814 E. Grace St., Spokane, Wash.
Filed Nov. 7, 1966, Ser. No. 592,361
Int. Cl. B61d 13/00
U.S. Cl. 141—1    5 Claims

ABSTRACT OF THE DISCLOSURE

A loading hopper movable along the course of a tram carrier to deposit a load in the carrier in substantially vertical fashion. The hopper rapidly accelerates to tram carrier speed and does not begin depositing its load until the carrier speed be attained. All forces created on the tram carrier during the loading operation are substantially vertically downward to prevent carrier motion.

---

This invention relates generally to the loading of tram carriers and more particularly to a mechanism that is adapted to load a moving tram carrier with a minimum of forces other than vertical being created thereon.

An ever present problem in the use of product trams is the loading of the tram carriers or buckets. The carrier, mechanically, is similar to a pendulum, relatively free to oscillate in a plan perpendicular to its direction of travel though relatively restrained from oscillation in a plane through its direction of travel. Oscillatory motion of tram carriers during operation of the tram is not desirable, as it oftentimes causes carriers to strike objects outside the normal course of carrier travel and causes ropes and cables to leave their normal channels of restraint.

Carriers, especially of bulk product trams, are commonly loaded while in motion. Commonly such carriers have been loaded from a stationary bin which presents product to the carrier with some impact, generally in a downward and sideward direction and with inertia in the direction of carrier travel, caused by the stationary mass of the product. Such varying forces cause a complex oscillation in the tram carrier which is not desirable. In the past various methods and ancillary structures have come into use to stop or lessen this oscillatory motion but none have proved completely effective. The instant invention provides a new process and apparatus for loading such tram carriers to substantially do away with the forces causing such motion in the inception. In so doing it is:

A principal object of my invention to provide a tram loading process and apparatus therefor to load a moving tram carrier with product having substantially the same directional velocity as the carrier to create only substantial vertical forces on the tram carrier at the time of loading.

A further object of my invention to provide apparatus of the nature aforesaid including a material hopper, moveable in the direction of motion of the tram carrier, impelled in a fashion to accelerate it rapidly to tram carrier velocity.

A further object of my invention to provide a gate in such apparatus by moving the loaded hopper off a restraining shelf so that the product carried in the hopper may have essentially the same directional velocity as the carrier at the time of communication therewith.

A still further object of my invention to provide apparatus of the nature aforesaid with appropriate controls to automatically regulate these motions.

A still further object of my invention to produce such apparatus that may be installed as an auxiliary structure to operate in conjunction with existing trams without modification thereof.

A still further object of my invention to provide a device of the nature aforesaid that is of new and novel design, of rugged and durable nature, of simple and economic manufacture, and otherwise well adapted to the purposes for which it is intended.

These and other objects of my invention will become apparent from consideration of the following specification and accompanying drawings. In carrying out the objects of my invention, however, it is to be understood that its essential features are susceptible of change in design, ordering and arrangement with only one preferred practical embodiment being illustrated, as required.

In the accompanying drawings, wherein like numbers of reference refer to similar parts throughout:

FIGURE 1 is an isometric view of my invention with a common tram carrier supported in operative position thereby, showing its general configuration, construction and detail.

Figure 2:
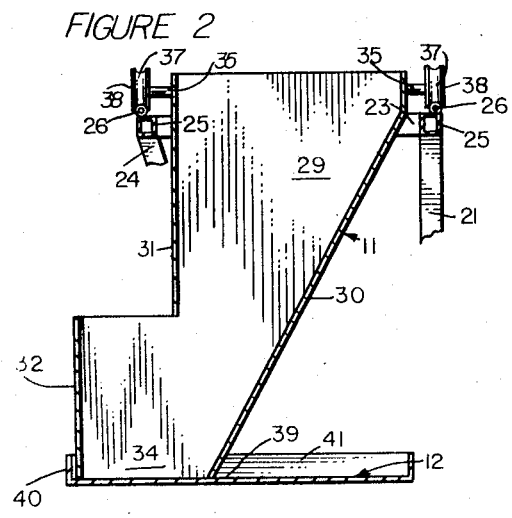
FIGURE 2 is a vertical cross-sectional view of a part of FIGURE 1, taken on the line 2—2 in the direction indicated by the arrows thereon, showing hopper configuration from this aspect.
Figure 3:
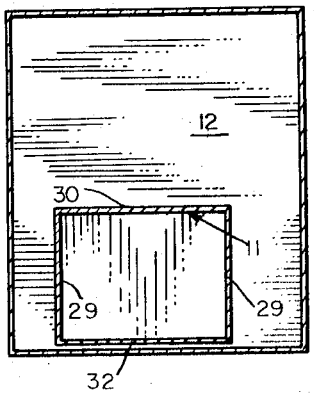
FIGURE 3 is a horizontal cross-sectional view of a part of the invention of FIGURE 1, taken on the line 3—3 in the direction indicated by the arrows thereon, showing hopper and shelf configuration from this aspect.
Figure 4:
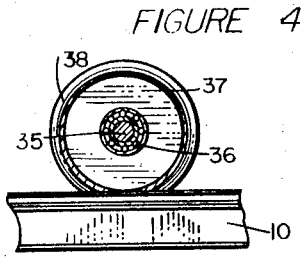
FIGURE 4 is a partial, cut-away cross-sectional view of a hopper supporting wheel and its associated rail, taken on the line 4—4 of FIGURE 1, in the direction indicated by the arrows thereon.

Referring now to the drawings in greater detail and particularly to that of FIGURE 1, it will there be seen that my invention comprises essentially hopper frame 10 rollably supporting hopper 11 over hopper shelf 12, all immediately adjacent to and position for travel in the direction of the travel of tram carrier 13.

Tram carrier 13 is not a part of my invention per se, but the invention is essentially associated with the carrier and its motion so the essential nature of the carrier must be understood to comprehend my invention. The carrier illustrated is typical of several varieties in commerce. It includes box-like receptacle 14, with a latchable, pivotably mounted bottom, suspended usually in a pivotable fashion about pins 16 communicating with yoke 17 of the carrier support. The yoke portion of the carrier support communicates with upper straight portion 18 which in turn structurally communicates with fastening device 19, supporting the entire carrier assembly upon traction rope 20 for motion in response to rope motion. Though the details of construction of these several parts vary considerably, all have these essentials in one fashion or another. My invention seeks to load, in the particular fashion heretofore set forth, such tram carriers during their normal lineal progression along a traction rope appropriately supported for motion, usually by plural sheaves carried by towers.

Hopper frame 10 is formed from uprights 21 supported by the earth, preferably in a concrete apron 22 immediately laterally adjacent the course of travel of tram carrier 13. The uprights structurally communicate with horizontal cross members 23 and these in turn, in their lateral extension toward the tram carrier, are joined by angled vertical support 24. Elongate rails 25 are supported in paired opposed fashion by the upper opposed sides of the hopper frame, all as illustrated particularly in FIGURE 1. These members are, in the illustrated example, formed of square channel iron and joined by welding, though other frames offering similar support and structural rigidity would undoubtedly serve the purposes of my invention.

The upper outer portion of side rails 25, between uprights 21a and 21b, is provided with lengths of cylindrical pipe 26 to serve as track for rollable motion of the hopper wheels thereover. Upright support member 21a is provided with additional vertical central member 27 carrying in its central portion compression spring adapted to yieldably stop forward motion of hopper 11 at an appropriate distance from the uprights 21a.

With the normal physical characteristics of average trams and products carried thereby, I prefer to use three sets of upright supports 21a, 21b, 21c spaced substantially equally as illustrated. In varying physical circumstances, it may be necessary to vary the support configuration to provide appropriate motion of my device, particularly if the nature of product or speed of tram be unusual.

Hopper 11 is provided for rollable motion on pipe rails 26 between uprights 21a and 21b. This member is formed from rigid metallic sheet material with similar sides 29, planar sloping end 30 and vertical end members 31 and 32, all shaped and positioned as illustrated to form an upper loading chute portion communicating with a lower load storing portion 34. The upper portion of the hopper extends above the upper surface of pipe rails 26 and carries jack axles 35 rotatably journaling bearings 36 mounted in wheels 37. These wheels have outer lateral flanges 38, and a medial configuration adapted to maintain the wheels in rollable position on pipe rails 26. The upward extension of the hopper is not critical beyond the point of supporting the hopper wheels 37, so long as it be adapted to receive material from an ordinary loading device of commerce thereabove (not shown).

The lowermost extension of hopper 11 slidably communicates with, or is positioned immediately above, the upper surface of body 39 of hopper shelf 12. This hopper shelf body is a substantially planar member supported by uprights 21b at an elevation slightly above the top of tram carrier receptacle 13, so material carried in the lower load storing portion 34 of the hopper can be passed by action of gravity therefrom and into receptacle 14. The body member thusly serves the purpose of a horizontal gate to prevent exit of material from hopper 11 until the receptacle 14 is appropriately positioned relative thereto. Peripheral angled side members 40 and end member 41 are provided about the three non-operative peripheral edges of body 39 for additional support and rigidity.

Immediately rearward of hopper 11, and positioned for extension in the direction of the hopper, is air cylinder 42. Body 43 and piston 44 of this structure are relatively elongate members, as illustrated, to provide a piston motion sufficient to move the hopper for some distance between the vertical supports 21a and 21b. Body 43 of this member is supported on lower cross members 23b and 23c by U-type supports 45. Cylinder 42 is of the double acting variety; in response to motion thereof hopper 11 is moved from a rearward position immediately adjacent vertical support 21b to a forward position immediately adjacent vertical support 21a and back again. Appropriate pivotable connection is provided to transmit this motion between hopper 11 and air cylinder 42.

Figure 5:
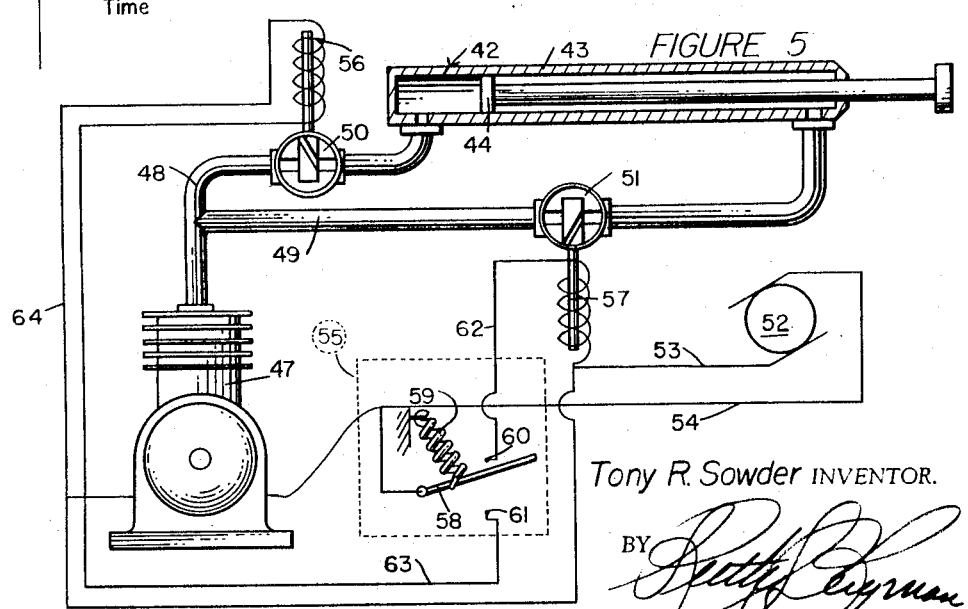
FIGURE 5 is a diagrammatic representation of the pneumatic and electrical systems of my invention, showing their relationship and operation in normal symbology.

The electric and pneumatic operating structure of my device is shown in FIGURE 5. Here it will be seen to include compressor 47 communicating by leads 48, 49 with body 43 of air cylinder 42. Lead 48 is controlled by self-bleeding solenoid valve 50 and lead 49 is controlled by self-bleeding solenoid valve 51, each regulating directional motion of piston 44 of the pneumatic cylinder. Electric power is provided to the system by generator 52 in three parallel circuits, one communicating by leads 53, 54 to supply power to compressor 47 and the other two each communicating in series through double-pole, double-throw switch 55 to solenoids 56, 57 of valves 50, 51 respectively.

Switch 55 has pivotably mounted arm 58, communicating electrically with lead 54, biased by spring 59 to a normal position communicating with pole 60; it is pivotably moveable by appropriate force to communicate with second pole 61. Pole 60 communicates by lead 62 to solenoid 57 and thence back to generator 52 through lead 53. Pole 61 communicates by lead 63 to solenoid 56 and then through lead 64 back to lead 53 and thence generator 52. With this electrical arrangement valve 51 will normally be activated and open to normally maintain piston 44 non-extended within air cylinder 43, but upon motion of switch arm 58 to contact pole 61 the cylinder will be activated through solenoid 56 and valve 50, to extend piston 44 and move the hopper structure forward toward uprights 21a. The compressor will, of course, be operative at all times to maintain appropriate pressure in the pneumatic lines.

Switch 55 is physically carried on upright 21c, preferably in an adjustable fashion, to allow motion of arm 58 parallel to the course of travel of hopper 11. The switch arm is allowed to project outwardly toward carrier 13 so it might make operative contact therewith. Switch arm contact rod 65 is an elongate member, as shown in FIGURE 1, positioned on receptacle 14 of tram carrier 13 so that it makes operative contact with arm 58 of switch 55 for the tram carrier passes thereby. Appropriate positioning for proper timing and operation of these devices is critical to my invention and must be further understood from the description of the operation of the mechanism.

With the structure of my invention having thusly been described, the operation of it can now be understood.

In the drawing of FIGURE 1, the tram carrier moves from left to right immediately laterally adjacent side rail 25 and under the lowermost surface of hopper shelf 12, so that as the carrier moves forwardly hopper 11 can be in a position appropriate to deposit its contents by gravity into receptacle 14 of the carrier 13.

Figure 6:
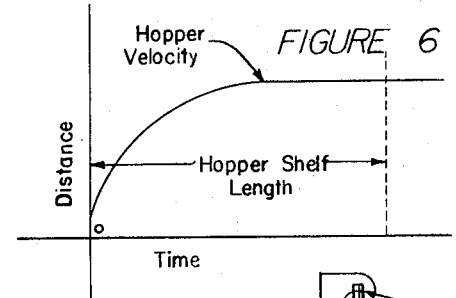
FIGURE 6 is a generalized Cartesian graph of hopper velocity showing its nature generally and particularly as related to hopper-shelf length.

With this structure, as carrier 13 progresses in its normal course of travel, hopper 11 will have one tram carrier load in it and be positioned immediately adjacent vertical support 21b by reason of switch 55 being in its normally biased position with valve 51 activated. In this condition as carrier 13 approaches the loading structure, switch arm contact rod 65 carried thereon will activate arm 58 of switch 55 to activate valve 50 for a brief period of time. Tram carrier 13 will continue in its normal course of travel forwardly. Upon the activation of valve 50 a burst of pressurized air will cause piston 44 to accelerate rapidly forwardly to impell hopper 11 and its contents forwardly. According to the velocity diagram of FIGURE 6, the capacity of air cylinder 42 is appropriately determined so that as the hopper passes forwardly and material therein is no longer restrained from vertical movement by hopper shelf 12, the hopper and contained material will at this time have approximately the same magnitude and direction of motion as carrier 13. At this time, the carrier will be immediately, or substantially, below hopper 11 and material carried therein will pass by gravity from the hopper to carrier with primarily vertical forces being exerted upon the carrier.

Since upon the happening of this operation, switch 55 will have returned to its normally biased condition, piston 44 of air cylinder 42 will return to its non-extended position and thus move hopper 11 back to its position immediately adjacent vertical support 21b where it is ready for refilling and recycling according to the operation just described to load the next tram carrier.

It is essential that the physical characteristics of the various components of my invention be appropriately adjusted to accomplish the purposes immediately described.

With normal operating conditions and materials, I have found that an elongate air cylinder of appropriate length to cause the described motions allows for an acceleration and velocity substantially as described, by reason or normal delays and expansions of air within the cylinder, with out any time delay mechanism. The normal action of air cylinder 42 provides the motion described since only a short burst of air is supplied to it and the expansion of this air in the enlarged space caused by piston motion decreases pressure and piston velocity so that after the piston arrives at substantially the same velocity as tram carrier 13, its motion is essentially linear and without acceleration. A pneumatic delay mechanism as well known, could be used if needed.

I have also found that switch 55 may generally be positioned a short distance rearward of the rearward part of shelf 12 as on support 21; the switch is preferably adjustably positioned to allow for minor regulations that may become necessary because of particular structures and operating conditions.

It is further to be noted that the return travel of hopper 11 will be aided by action of compression spring.

It is further to be noted that in this loading process the material carried by the loading hopper will have substantially the same magnitude and direction of velocity as the tram carrier and therefore will create no substantial force except vertical when it be deposited in the carrier. Stationary loaders obviously cannot accomplish this result as the material deposited will exert a force other than vertical on the tram carrier by reason of material inertia or differential velocity in a plane other than vertical.

It is further to be noted that material will begin leaving hopper 11 by action of gravity when its forwardmost edge passes over the forwardmost edge of hopper shelf 12, but at this time the material will have motion substantially the same as the tram carrier. This provides for a much more rapid dumping in my loading operation than in other types of loader and this rapid dumping is essential to load in the manner described.

The foregoing description is necessarily of a detailed nature so that a specific embodiment of my invention may be set forth as required, but it is to be understood that various modifications, rearrangement and multiplication of parts and changes in ordering of operations may be resorted to without departing from the spirt, essence or scope of my invention.

Having thusly described my invention, what I desire to protect by Letters Patent, and

What I claim is:

1. Apparatus of the nature aforesaid for loading a moving tram, comprising, in combination:
    a frame laterally adjacent the course of travel of a tram, extending substantially parallel to said course of travel;
    a hopper carried for motion on said frame parallel to the direction of travel of said tram, said hopper biased to a normally rearward position;
    a substantially horizontal hopper shelf carried by said frame adapted to maintain material in said hopper when said hopper is thereover; and
    means of accelerating said hopper to a velocity substantially equal to that of said tram carrier, said hopper shelf being so positioned that when said velocity is substantially reached said hopper will pass thereover to deposit its contents by action of gravity into a carrier therebelow so that substantially no forces other than vertical will be exerted by said contents upon said carrier.

2. The invention of claim 1 wherein the means of accelerating said hopper comprise:
    an elongate, double acting, pneumatic cylinder carried by said frame and adapted to accelerate said hopper as stated upon presentment of pressurized gas thereto and thereafter return the hopper to its normal biased position.

3. The invention of claim 1 having spring biasing means disposed to aid said hopper to return to an initial position.

4. The invention of claim 1 further characterized by an electric control circuit having;
    a source of electric energy;
    a compressor power circuit in parallel therewith;
    two valve circuits in parallel with said source of electric energy and said power circuit, each in series with a double-pole, double-throw switch and a solenoid valve adapted to normally bias a cylinder piston to a non-extended position but move to a second position to cause extension of said piston.

5. The method of loading moving tram carriers including:
    the establishment of a one carrier load of material in a moveable hopper having restraining means to maintain said material therein;
    the moving of said hopper with contained material in a path above that traversed by a tram carrier with rapid acceleration to a velocity substantially of the same magnitude and direction as that of said carrier; and
    the removal of restraining means allowing material carried in said hopper to move vertically therefrom at such time as the motion of said hopper is substantially the same as that of said carrier and said hopper is substantially over said carrier so that the material carried in said hopper will be deposited into said carrier with substantially no forces other than vertical exerted on said carrier.

References Cited

UNITED STATES PATENTS

| 1,248,805 | 11/1917 | Febre | 214—43 |
| 1,684,319 | 9/1928 | Heiden | 214—43 |
| 3,330,311 | 7/1967 | Christine et al. | 141—190 X |

LAVERNE D. GEIGER, Primary Examiner

EDWARD J. EARLS, Assistant Examiner

U.S. Cl. X.R.

141—137, 232, 284; 214—43